(12) United States Patent
Minami et al.

(10) Patent No.: US 8,469,046 B2
(45) Date of Patent: Jun. 25, 2013

(54) METHOD FOR PARALLEL OPERATION OF REACTORS THAT GENERATE MOISTURE

(75) Inventors: Yukio Minami, Osaka (JP); Keiji Hirao, Osaka (JP); Masaharu Taguchi, Osaka (JP); Toshiro Nariai, Osaka (JP); Koji Kawada, Osaka (JP); Akihiro Morimoto, Osaka (JP); Nobukazu Ikeda, Osaka (JP)

(73) Assignee: Fujikin Incorporated, Osaka (JP)

( * ) Notice: Subject to any disclaimer, the term of this patent is extended or adjusted under 35 U.S.C. 154(b) by 139 days.

(21) Appl. No.: 12/596,395

(22) PCT Filed: Apr. 17, 2007

(86) PCT No.: PCT/JP2007/000419
§ 371 (c)(1),
(2), (4) Date: Oct. 16, 2009

(87) PCT Pub. No.: WO2008/136042
PCT Pub. Date: Nov. 13, 2008

(65) Prior Publication Data
US 2010/0143239 A1    Jun. 10, 2010

(51) Int. Cl.
*F17D 1/16* (2006.01)
(52) U.S. Cl.
USPC .............................. 137/14; 438/935; 422/187
(58) Field of Classification Search
USPC .............................. 137/14; 438/935; 422/187
See application file for complete search history.

(56) References Cited

U.S. PATENT DOCUMENTS 6,422,264 B2 *  7/2002  Ohmi et al. ................ 137/487.5
7,258,845 B2 *  8/2007  Ohmi et al. .................... 422/211
7,815,872 B2 * 10/2010  Nariai et al. .................... 422/198
2001/0004903 A1  6/2001  Ohmi et al.
2002/0122758 A1  9/2002  Ohmi et al.

FOREIGN PATENT DOCUMENTS

| JP | 2001048501 A | 2/2001 |
|---|---|---|
| JP | 3639469 B2 | 4/2005 |
| JP | 2006027974 A | 2/2006 |
| WO | 97/28085 | 8/1997 |
| WO | 00/63756 | 10/2000 |
| WO | 01/10774 A1 | 2/2001 |
| WO | 2006/008949 A1 | 1/2006 |

OTHER PUBLICATIONS

Perry's Chemical Engineering Handbook, 7th ed., section 10-15 (1997).*

(Continued)

*Primary Examiner* — Melvin Curtis Mayes
*Assistant Examiner* — Melissa Stalder
(74) *Attorney, Agent, or Firm* — Griffin & Szipl, P.C.

(57) ABSTRACT

The method for parallel operation of moisture generating reactors according to the present invention operates so that an orifice, provided with an orifice hole having a predetermined opening diameter, is disposed on a mixed-gas inlet side of each of a plurality of moisture generating reactors connected in parallel with each other, and mixed gas G consisting of hydrogen and oxygen is supplied from a mixer to each of the moisture generating reactors through each orifice, and the flows of moisture generated by the moisture generating reactors are combined, and the resulting combined moisture is supplied to an apparatus that uses high-purity water. Thus, a need to increase the amount of high-purity water supply is met by allowing a plurality of moisture generating reactors to perform a parallel water generating operation by branching off a mixed gas consisting of $H_2$ and $O_2$ by using a simple orifice construction.

10 Claims, 10 Drawing Sheets

OTHER PUBLICATIONS

International Search Report, issued in corresponding application No. PCT/JP2007/000419, completed Jul. 12, 2007, mailed Jul. 24, 2007.
Orifice Plates for Flow Measurement & Flow Restriction 1-8 (Cameron International Corp. 2010), filed herewith as Exhibit A.
Orifice Plates & Orifice Flange Assemblies (Eureka Industrial Equipments PVT. LTD. 2012), four pages, filed herewith as Exhibit B.
Orifice Plates (Superior Products, Inc. 2001), six pages.
Standard Outline Dimensional Drawing for Model 1195 Integral Orifice Assembly (Dieterich Standard 2002), eight pages.
Orifice Plate Type Flow Detector—Instrumentation, at http:www.engineersedge.com/instrumentation/orifice_orifice_plate_flow_ . . . (downloaded Feb. 7, 2012), two pages.
Nelson Urdaneta, Eliminating the Effects of Gas-system Pressure Transients, at http://www.electroiq.com/articles/sst/print/volume-44/issue-2/features/gases-gas-flow/eliminating-the-effects-of-gas-system-pressure-transients._printArticle.html (downloaded Oct. 5, 2012, seven pages).

\* cited by examiner

FIG. 4 (a) Divided-flow error with respect to the flow rate (MFM1) classified according to orifice diameters
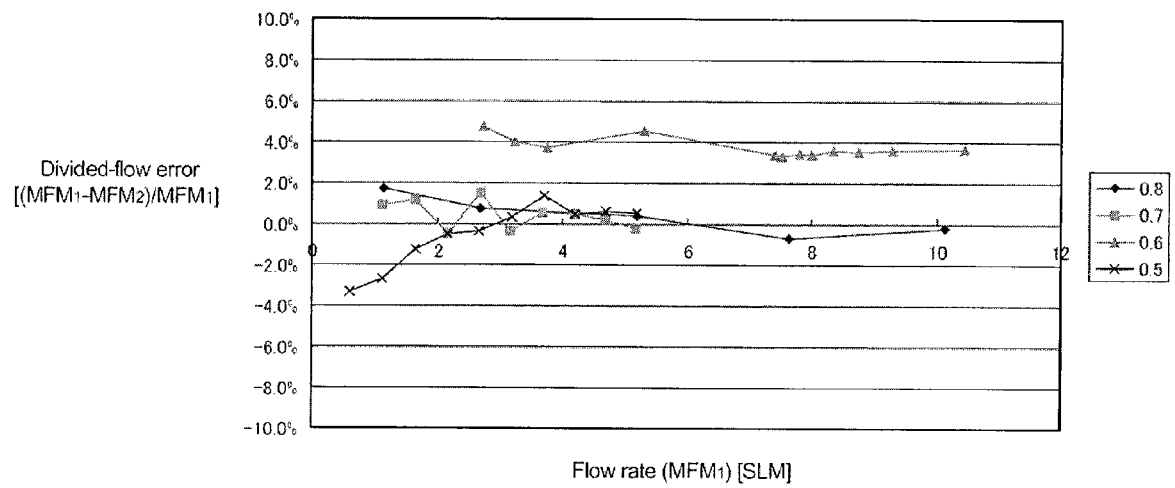
Flow rate (MFM1) [SLM]
FIG. 4 (b) Divided-flow error with respect to upstream pressure P2 classified according to orifice diameters
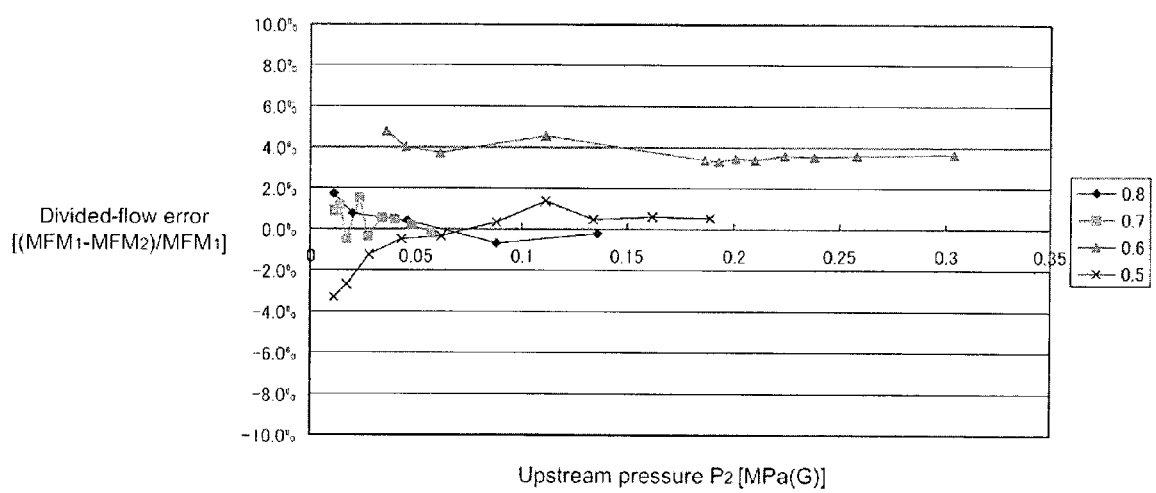
Upstream pressure P2 [MPa(G)]

Prior Art

Prior Art

METHOD FOR PARALLEL OPERATION OF REACTORS THAT GENERATE MOISTURE

This is a National Phase Application in the United States of International Patent Application No. PCT/JP2007/000419 filed Apr. 17, 2007. The entire disclosure of the above patent application is hereby incorporated by reference.

FIELD OF THE INVENTION

The present invention relates to a method for the parallel operation of moisture-generating reactors that is used in, for example, semiconductor manufacturing facilities, or chemical manufacturing facilities, and that enables each moisture generating reactor to perform a stable parallel operation in a predetermined amount of moisture generation merely by inserting orifices, each of which has an appropriate opening diameter, into the source-gas supply lines of the moisture generating reactors, respectively, that perform a parallel operation without using a special apparatus that divides the flow of source gas and supplies the gas.

BACKGROUND OF THE INVENTION

For example, in silicon-dioxide-film adhesion processing according to a moisture oxidation method used by semiconductor manufacturing facilities, a high-purity water supply is required, and, in usual cases, the necessary high-purity moisture is supplied by a moisture generating reactor as shown in, for example, FIG. 8.

More specifically, this moisture generating reactor is structured so that, as disclosed by International Publication No. WO97/28085 and by Japanese Patent No. 3639469, a reactor body 1 having a space 4 thereinside is formed by assembling an inlet-side reactor body member 2 and an outlet-side reactor body member 3 together so as to face each other, and the reactor body 1 is provided with a source gas inlet 5, a moisture gas outlet 6, a reflector 7, and a reflector 8, and, furthermore, a platinum coating film 9 is formed on an inner surface of the outlet-side reactor body member 3.

When moisture is generated, mixed gas G consisting of oxygen $O_2$ and hydrogen $H_2$ is first supplied from the source gas inlet 5 into the space 4, and is then stirred by the reflectors 7 and 8 while oxygen $O_2$ and hydrogen $H_2$ are activated by the catalytic action of the platinum coating film 9. Thereafter, activated oxygen $O_2$ and hydrogen $H_2$ are allowed to instantaneously react with each other in a non-combustion state below a temperature of 450° C., thus generating water. The resulting water is discharged from the moisture gas outlet 6 out of the reactor body 1 in the form of moisture gas W.

In spite of the fact that the moisture generating reactor structure, as shown in FIG. 8, is very small (for example, about 114 mm in outer diameter and about 35 mm in thickness), the moisture generating reactor can continuously generate moisture gas W of about 2 SLM (which is a moisture gas quantity calculated in a standard state at a temperature of 0° C. and at 1 atmosphere of pressure, wherein SLM is an abbreviation for "Standard Liters per Minute") by the catalytic reaction performed below a temperature of 400° C. Thus, the moisture generating reactor structure shown in FIG. 8 has an excellent, practicable effect.

However, in the moisture generating reactor shown in FIG. 8, if the supply of the source gas G is increased in amount so as to increase the amount of moisture generation, a rise in temperature of the outlet-side reactor body member 3 becomes steep, and the temperature of the internal space of the reactor body 1 will rise and approach the explosive temperature of the source gas G, which is $H_2$—$O_2$ mixed gas, and, as a result, an extremely dangerous state will be reached.

Additionally, if the supply of the source gas G is increased in amount, the rate of reaction between hydrogen $H_2$ and oxygen $O_2$ will fall, and oxygen $O_2$ and hydrogen $H_2$ will enter into, and mix with, moisture gas W without allowing oxygen $O_2$ and/or hydrogen $H_2$ to react with each other, and, as a result, various disadvantages will occur on the process side where the moisture gas W is used. Additionally, if the temperature of the reactor body 1 rises, the platinum coating film 9 formed on the inner wall surface of the outlet-side reactor body member 3 will peel and fall off, and, as a result, a significant deterioration in catalytic action will result.

On the other hand, in order to avoid the occurrence of the disadvantages mentioned above, a moisture generating reactor structured to advance heat dissipation from the reactor body 1 has been developed by providing cooling fins 10 and 11 on the outer wall surface of the inlet-side reactor body member 2 and on the outer wall surface of the outlet-side reactor body member, respectively, as shown in FIG. 9. In FIG. 9, reference numeral 12 designates an electric heater that is used to raise the temperature of the moisture generating reactor 1 to nearly 300° C. when the moisture generating reactor 1 is started.

However, a problem resides in the fact that the disposition of the cooling fins 10 and 11 leads to a great increase in outside dimensions of the moisture generating reactor 1, and, if the amount of moisture generation is made, for example, 1.3 times as great as the conventional amount of moisture generation, the volume of the reactor 1 must be tripled, and hence it is impossible to meet the requirement of reducing the moisture generating reactor 1 in size. A possible method for increasing the amount of moisture generation, without using the cooling fins 10 and 11, is to increase the outside dimensions of the reactor body 1. However, if the area in which the platinum coating film 9 is formed exceeds a predetermined area, unevenness will occur in the temperature distribution on the inner surface of the outlet-side reactor body member 3 when moisture is generated, and, as a result, the platinum coating film 9 may readily peel off. Therefore, another problem resides in the fact that, if the inner diameter of the reactor body 1 is made, for example, twice or more as large as the conventional one, the frequency of occurrence of peeling off of the platinum coating film 9 will rise steeply, as is well known, and the requirement of increasing the amount of moisture generation cannot be satisfactorily met.

Therefore, when employing the above-described type of conventional equipment for supplying moisture gas W, a plurality of moisture generating reactors may be connected in parallel with each other. Then, the flow rate of mixed gas G supplied to each moisture generating reactor is controlled by use of a highly accurate apparatus (i.e., a mixed-gas-flow-dividing-and-supplying apparatus) that divides the flow of the mixed gas G and that supplies the gas to each moisture generating reactor in order to meet the requirement of increasing the amount of moisture generation (i.e., the amount of moisture that needs to be supplied).

However, still another problem resides in the fact that the disposition of the highly accurate apparatus for dividing the flow of the mixed gas G, and supplying the gas, brings about not only a steep rise in the amount of equipment employed, but also brings about the need for a large space for the installation of the equipment, and furthermore, it increases costs for the maintenance, or the like, of the mixed-gas-flow-dividing-and-supplying apparatus.

Patent Literature 1: International Publication No. WO97/28085
Patent Literature 2: Japanese Patent No. 3639469

Problems to be Solved by the Invention

The present invention has been made to solve the above-mentioned problems occurring in equipment for supplying high-purity moisture used by a conventional moisture generating reactor. Specifically, the present invention has been made to solve (i) the problem of given constraints on meeting the requirement of increasing the amount of to-be-supplied moisture by increasing the moisture generating reactor in size (or in volume) because there is a limit to the enlargement of the moisture generating reactor from the viewpoint of structural factors, such as the durability of the platinum coating catalyst film, and (ii) the problem of the steep rise in equipment costs and in management costs, and in the need for a large installation space for the mixed-gas-flow-dividing-and-supplying apparatus, which are problems caused when the need to increase the amount of to-be-supplied moisture is met by employing the-mixed-gas-flow-dividing-and-supplying apparatus that divides the flow of mixed gas G and that supplies the gas, and by supplying the mixed gas G to a plurality of moisture generating reactors performing a parallel water generating operation. It is therefore a main object of the present invention to provide a method for the parallel operation of moisture generating reactors that is capable of supplying a predetermined amount of mixed gas G to each moisture generating reactor performing a parallel water generating operation by employing a simple mechanism at low cost, which is accurate and capable of easily meeting the need to increase the amount of moisture generation by attaching orifices, each of which has a predetermined inner diameter to mixed-gas supply lines, respectively. Thus, another object of the present invention is to supply mixed gas to the moisture generating reactors performing a parallel operation without requiring a structurally complex apparatus for dividing the flow of mixed gas G and that supplies the gas in amounts required.

SUMMARY OF THE INVENTION

The invention, in accordance with a first embodiment of the invention, employs an orifice disposed on a mixed-gas inlet side of each of a plurality of moisture generating reactors; an end on an inlet side of each orifice is connected to a mixed gas supply line in parallel; and mixed gas consisting of hydrogen and oxygen is allowed to branch off and is supplied to each of the moisture generating reactors through each of the orifices.

The invention, according to a second embodiment, employs orifices that are disposed on the mixed-gas inlet sides of a plurality of moisture generating reactors, respectively; an end on an inlet side of each of the orifices is connected to a mixed-gas supply line in parallel; mixed gas consisting of hydrogen and oxygen is allowed to branch off and is supplied to each of the moisture generating reactors through each of the orifices; ends on moisture-gas outlet sides of the moisture generating reactors are connected in parallel with each other; and moisture generated by each of the moisture generating reactors is supplied along a moisture supply line to an apparatus that uses the moisture.

The invention according to a third embodiment modifies the second embodiment so that the apparatus using the moisture is a process chamber used under pressure that is approximately atmospheric pressure.

The invention according to a fourth embodiment modifies the second embodiment so that the apparatus using the moisture is a process chamber used under a pressure of 1 to 700 Torr, and the moisture supply line along which moisture generated from the moisture generating reactors is supplied is provided with a depressurizing orifice.

The invention according to a fifth embodiment modifies either the first or the second embodiment so that the number of the moisture generating reactors connected in parallel with each other is two; and the orifices disposed on the mixed-gas inlet sides of the moisture generating reactors are equal in opening diameter to each other; and mixed gases that are substantially equal in amount to each other are supplied from the mixed-gas supply lines to each of the moisture generating reactors, respectively.

The invention according to a sixth embodiment further modifies the fifth embodiment so that a rated amount of moisture generation for each of the moisture generating reactors is 5 SLM to 10 SLM, and the opening diameter of the orifice disposed on the mixed-gas inlet side is 0.8 to 0.6 mmφ.

The invention according to a seventh embodiment further modifies the sixth embodiment so that an internal pressure of each moisture generating reactor has a pressure value of 200 Torr or more.

The invention according to an eighth embodiment modifies the first embodiment or the second embodiment so that each moisture generating reactor is structured so that the moisture generating reactor has an internal space, which is achieved by combining an inlet-side reactor body member and an outlet-side reactor body member together so as to face each other; the inlet-side reactor body member is provided with a mixed-gas inlet, whereas the outlet-side reactor body member is provided with a moisture-gas outlet; a platinum coating film is disposed on an inner wall surface of the outlet-side reactor body member; a reflector is disposed in the internal space; and moisture is generated by allowing the hydrogen gas and the oxygen gas of the mixed gas to react with each other by catalytic action of the platinum coating film under a non-combustion state inside the internal space.

Effects of the Invention

In accordance with the present invention, mixed gas, which is a source gas used to generate moisture, can be allowed to branch off with extreme accuracy by using a flow-dividing structure having a simple construction in which an orifice having a predetermined opening diameter is only disposed on the mixed-gas inlet side of each of the moisture generating reactors connected in parallel with each other, and a large amount of high-purity water can be supplied using a non-combustion type moisture generating reactor that employs a conventional platinum coating catalyst. In other words, according to the present invention, a large amount of high-purity water can be supplied safely, and at lower cost, by using a conventional non-combustion type moisture generating reactor without using a mixed-gas-flow-dividing apparatus that is high in cost, and complex in structure, and without having to enlarge the equipment to supply the large amount of high-purity water.

Figure 1:
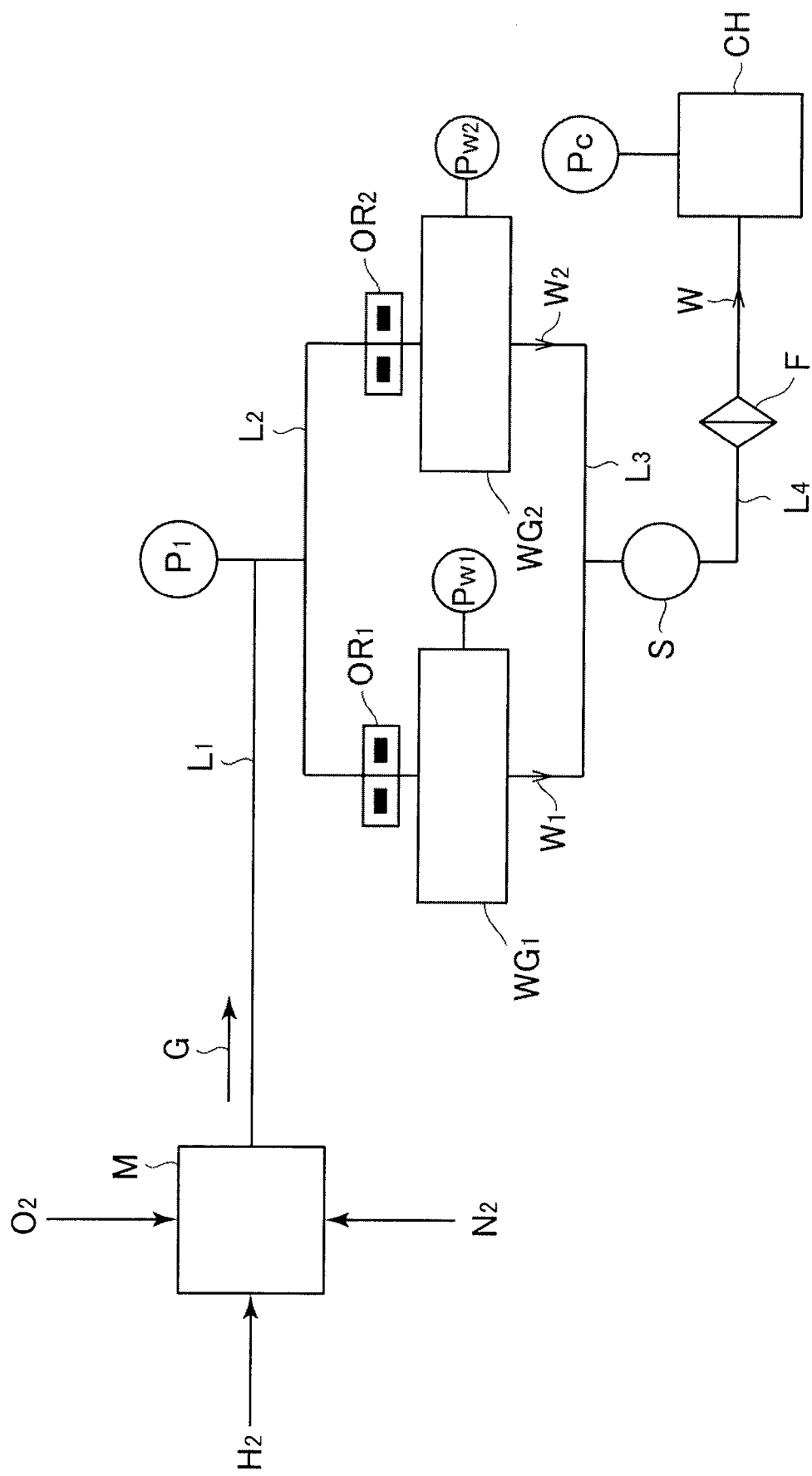
FIG. 1 is a system diagram that shows the parallel operation of moisture generating reactors in accordance with a first non-limiting, illustrative embodiment of the present invention.

DESCRIPTION OF SYMBOLS $H_2$: Hydrogen gas
$O_2$: Oxygen gas
$N_2$: Nitrogen gas
M: Gas mixer that mixes $H_2$ and $O_2$
G: Mixed gas (Source gas)
$WG_1$, $WG_2$: Moisture generating reactors
$OR_1$, $OR_2$, $OR_3$: Orifices
S: $H_2$ gas sensor
F: Filter
CH: Process chamber
$P_1$, $Pw_1$, $Pw_2$, Pc: Pressure gauges
$W_1$, $W_2$, W: Moisture (Moisture gas) lines
$L_1$, $L_2$, $L_3$, $L_4$: Tube lines
$MFC_1$, $MFM_1$, $MFM_2$: Mass flowmeters
$HTC_1$-$HTC_4$: Temperature controllers
$RG_1$-$RG_4$: Pressure regulators
$V_1$-$V_4$: Valves
$FA_1$, $FA_2$: Cooling fans
$HTM_1$, $HTM_2$: Temperature monitors
1: Reactor body
2: Inlet-side reactor body member
3: Outlet-side reactor body member
4: Internal space of the reactor body
5: Mixed-gas inlet (Source-gas inlet)
6: Moisture-gas outlet
7, 8: Reflectors
9: Platinum coating film
10, 11: Cooling fins

DETAILED DESCRIPTION OF THE INVENTION

Non-limiting illustrative embodiments of the present invention will be hereinafter described with reference to the drawings. FIG. 1 shows a first illustrative embodiment of the present invention, and depicts an example in which moisture W is supplied to a process chamber CH under normal pressure by use of two moisture generating reactors $WG_1$ and $WG_2$.

In FIG. 1, $H_2$ designates hydrogen gas, $O_2$ designates oxygen gas, $N_2$ designates nitrogen gas, M designates a gas mixer that mixes $H_2$ and $O_2$, G designates mixed gas, $WG_1$ and $WG_2$ designate moisture generating reactors, $OR_1$ and $OR_2$ designate orifices, S designates a $H_2$ sensor, F designates a filter, CH designates a process chamber, $P_1$, $Pw_1$, $Pw_2$, and Pc designate pressure gauges, $W_1$, $W_2$, and W designate moisture, and $L_1$, $L_2$, $L_3$, and $L_4$ designate tube lines.

The two moisture generating reactors $WG_1$ and $WG_2$ used herein are the same in structure, and are made of stainless steel. Each of the moisture generating reactors $WG_1$ and $WG_2$ is about 180 mmϕ in outer diameter, and is about 37 mm in thickness. A platinum coating film is formed on the inner wall surface of an outlet-side reactor body member of the reactor. Although the two moisture generating reactors, each having the same structure, are connected together in parallel in this non-limiting embodiment of the invention, more than two moisture generating reactors, for example, three to five moisture generating reactors may be connected together in parallel in accordance with the present invention.

Each of the orifices $OR_1$ and $OR_2$ is formed by boring a predetermined orifice hole (e.g., a circular hole) in a thin stainless steel plate having an outer diameter of about 12 mmϕ and a thickness of 0.2 to 1.0 mm to form an orifice or orifice member, and each orifice member is replaceably inserted in an orifice inserter (not shown in the drawings). In this embodiment of the invention, the orifices $OR_1$ and $OR_2$, each of which has an orifice hole of 0.5 to 1.0 mmϕ formed therein, are used as described later.

Each of the tube lines $L_1$ to $L_4$ is formed of a stainless steel tube having an inner diameter of 4.3 mmϕ and an outer diameter of 6.35 mmϕ, and the process chamber CH that consumes generated moisture W is used to perform various semiconductor processings under normal pressure (i.e., 760 Torr).

With reference to FIG. 1, mixed gas G supplied from the gas mixer M passes through the mixed gas supply line $L_1$ and through the orifices $OR_1$ and $OR_2$ (0.6 mmϕ or 0.7 mmϕ), and is supplied to the moisture generating reactors $WG_1$ and $WG_2$. Moistures $W_1$ and $W_2$ generated by the reactors $WG_1$ and $WG_2$, respectively, are supplied to the normal-pressure chamber CH through the moisture supply line $L_4$. In order to allow mixed gas G to smoothly branch off and be supplied to the two reactors, the relationship $P_1 > P_W > P_C$ is required to be established among pressures $P_1$, $P_W$, and $P_C$. Additionally, pressure $P_C$ is made smaller (e.g., about 0.02 to 0.03 MPa) than pressure $P_W$ due to pressure loss in the tube lines $L_3$ and $L_4$.

Table 1, presented below, shows one example of provisional calculations of the upstream-side pressure $P_1$ corresponding to the orifices $OR_1$ and $OR_2$ when the mixture ratio of $H_2$ and $O_2$, and the moisture-supply flow rate (Standard Cubic Centimeters per Minute, abbreviated "sccm") to the process chamber CH under normal pressure (760 Torr), are changed under the condition that the opening diameter of each of the orifices $OR_1$ and $OR_2$ is 0.6 or 0.7 mmϕ. Under these conditions, the estimated value of the pressure can be determined. Equations (2) and (3), provided below, are used as the pressure computing equation in accordance with the present invention, and the length of the tube line, which is formed of a stainless steel tube having an inner diameter of 4 mmϕ, is 600 mm to 800 mm. In Table 1, the amount of supply moisture per reactor is shown.

TABLE 1

Examination of upstream orifice diameters 0.6 and 0.7

| $H_2$ (sccm) | $O_2$ (sccm) | $N_2$ (sccm) | $H_2O$ (sccm) | Excess $O_2$ (sccm) | Total Flow Rate (sccm) | Orifice (mm) | Calculation of sound velocity Pressure (Torr abs) | Calculation of subsonic velocity Necessary differential pressure (Torr) | Examination of upstream necessary pressure Calculation of sound velocity (MPa G) | Calculation of subsonic velocity (MPa G) |
|---|---|---|---|---|---|---|---|---|---|---|
| 5000 | 4000 | 0 | 5000 | 1500 | 9000 | 0.6 | 2174.305 | 1555.389 | 0.189 | 0.207 |
| 5000 | 3500 | 0 | 5000 | 1000 | 8500 | 0.6 | 1986.777 | 1298.662 | 0.164 | 0.173 |
| 5000 | 3000 | 0 | 5000 | 500 | 8000 | 0.6 | 1796.626 | 1061.973 | 0.138 | 0.142 |
| 4500 | 4500 | 0 | 4500 | 2250 | 9000 | 0.6 | 2289.427 | 1724.453 | 0.204 | 0.230 |
| 4500 | 2700 | 0 | 4500 | 450 | 7200 | 0.6 | 1616.963 | 860.198 | 0.114 | 0.115 |
| 5000 | 3000 | 0 | 5000 | 500 | 8000 | 0.7 | 1319.970 | 573.226 | 0.075 | 0.076 |
| 4000 | 2400 | 0 | 4000 | 400 | 6400 | 0.7 | 1055.976 | 366.865 | 0.039 | 0.049 |
| 3000 | 1800 | 0 | 3000 | 300 | 4800 | 0.7 | 791.982 | 206.361 | 0.004 | 0.028 |

Figure 2:
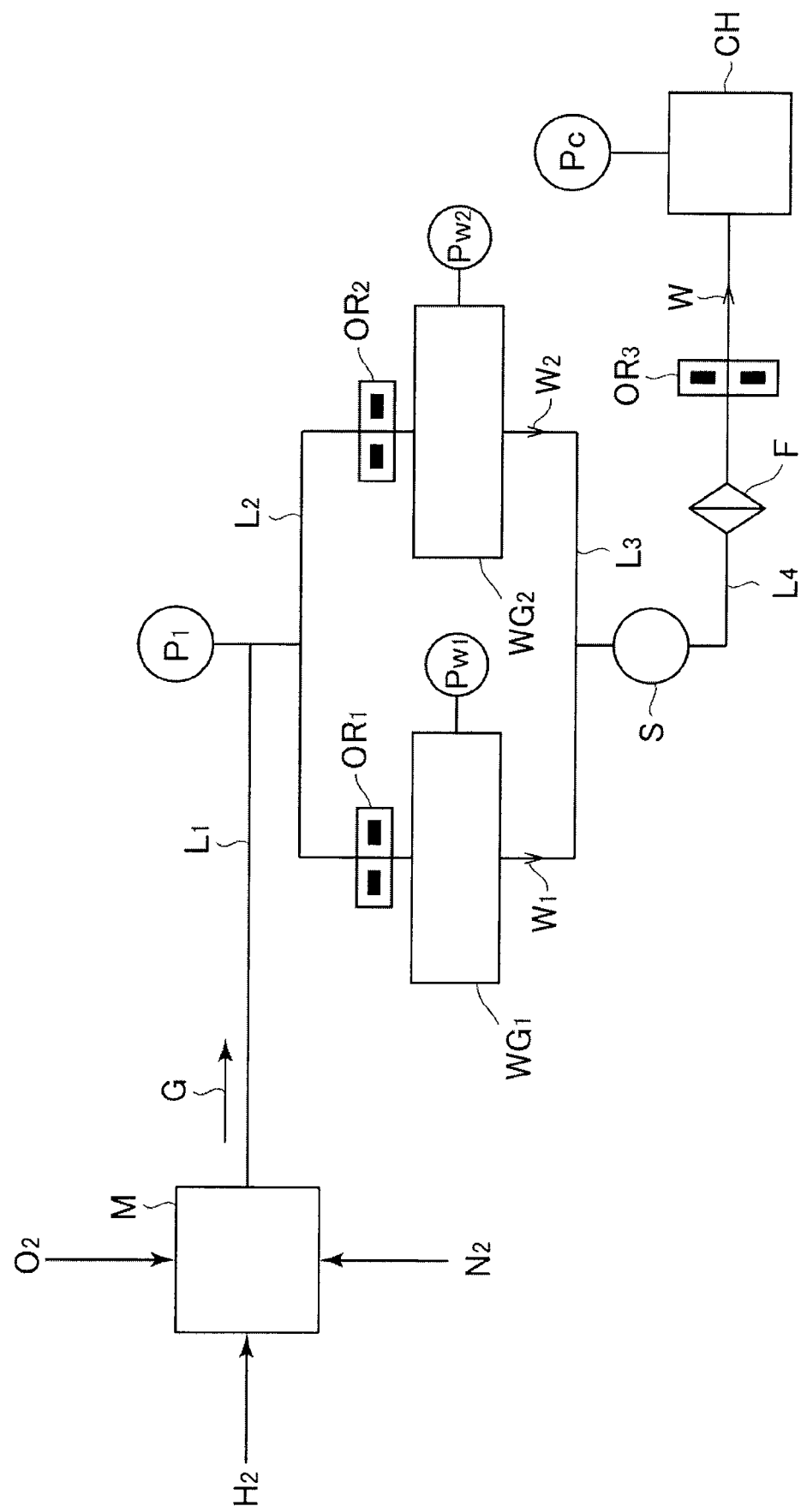
FIG. 2 is a system diagram that shows the parallel operation of moisture generating reactors in accordance with a second non-limiting, illustrative embodiment of the present invention.

FIG. 2 shows a second non-limiting, illustrative embodiment of the present invention, and depicts an example in which generated moisture W is supplied from the two moisture generating reactors $WG_1$ and $WG_2$ to the process chamber CH, which is used in a depressurized state of 1 to 100 Torr. In accordance with FIG. 2, $OR_3$ designates an orifice disposed on the downstream side of the filter F, and is provided to depressurize generated moisture W supplied to the chamber CH.

In this non-limiting, illustrative embodiment of the present invention, in order to allow mixed gas G to smoothly branch off and be supplied to the reactors so that a predetermined amount of generated moisture $W_1$ and $W_2$ are supplied from the moisture generating reactors $WG_1$ and $WG_2$, respectively, in the same way as in the first non-limiting, illustrative embodiment shown in FIG. 1, each of the moisture generating reactors $WG_1$ and $WG_2$ is required to have a pressure of 200 Torr to 900 Torr. The reason is that, if the internal pressure of each of the moisture generating reactors $WG_1$ and $WG_2$ falls below 200 Torr, the explosion limit temperature (i.e., explosive temperature) of $H_2$ gas will be lowered to a temperature of about 350° C. to 400° C.

Table 2 shows an example of arithmetic values of the internal pressure $P_W$, and so forth, for the moisture generating reactors $WG_1$ and $WG_2$ when the opening diameter of the depressurizing orifice $OR_3$ is 0.8 mmφ and 1.0 mmφ, and the pressure computing equation, etc., used herein are the same as used in obtaining values shown in Table 1 above.

TABLE 2

Examination of orifice diameters 0.8 and 1.0 (for depressurizing)

| Amount of gas introduced per reactor WVG | | | | | Total of two reactors Total downstream flow rate (sccm) | Calculation of sound velocity | | Inflow gas to Pc | | |
|---|---|---|---|---|---|---|---|---|---|---|
| $H_2$ (sccm) | $O_2$ (sccm) | $N_2$ (sccm) | $H_2O$ (sccm) | Excess $O_2$ (sccm) | | Orifice (mm) | WVG Pressure (Torr abs) | Specific gravity | Cv value | Flow rate $m^3$/Hr |
| 5000 | 3500 | 0 | 5000 | 1000 | 12000 | 1.0 | 849.831 | 0.350575 | 0.036941 | 0.72 |
| 5000 | 3000 | 0 | 5000 | 500 | 11000 | 1.0 | 758.423 | 0.332288 | 0.036941 | 0.66 |
| 4000 | 3000 | 0 | 4000 | 1000 | 10000 | 1.0 | 716.274 | 0.358621 | 0.036941 | 0.6 |
| 4000 | 2400 | 0 | 4000 | 400 | 8800 | 1.0 | 606.738 | 0.332288 | 0.036941 | 0.528 |
| 3500 | 2400 | 0 | 3500 | 650 | 8300 | 1.0 | 585.765 | 0.348151 | 0.036941 | 0.498 |
| 5000 | 3000 | 0 | 5000 | 500 | 11000 | 0.8 | 1185.036 | 0.332288 | 0.023642 | 0.66 |
| 4000 | 2400 | 0 | 4000 | 400 | 8800 | 0.8 | 948.029 | 0.332288 | 0.023642 | 0.528 |
| 3500 | 2000 | 0 | 3500 | 250 | 7500 | 0.8 | 800.833 | 0.326437 | 0.023642 | 0.45 |
| 3000 | 1800 | 0 | 3000 | 300 | 6600 | 0.8 | 711.022 | 0.332288 | 0.023642 | 0.396 |

Table 3 shows one example of the arithmetic operation of pressure values on the upstream side of the orifices $OR_1$ and $OR_2$, under the condition that the opening diameter of each of the upstream-side orifices $OR_1$ and $OR_2$ is 0.7 mmφ, when the mixing conditions, etc., of mixed gas G are the same as in Table 2. From this data, the outline or curve of the pressure values $P_1$ on the upstream side of the orifices $OR_1$ and $OR_2$ can be determined.

TABLE 3

Examination of orifice diameters 0.8 and 1.0 (for depressurizing)
Examination of upstream-side (flow-dividing) orifice (An increase in pressure
from necessary pressure of the depressurizing orifice)

| Amount of gas introduced per reactor | | | | | | | | | |
|---|---|---|---|---|---|---|---|---|---|
| $H_2$ (sccm) | $O_2$ (sccm) | $N_2$ (sccm) | $H_2O$ (sccm) | Excess $O_2$ (sccm) | Total Flow rate (sccm) | Orifice (mm) | Increase in pressure (Torr) | Upstream pressure (Torr abs) | Pressure (MPa G) |
| 5000 | 3500 | 0 | 5000 | 1000 | 8500 | 0.7 | 1460 | 2309.504 | 0.221023 |
| 5000 | 3000 | 0 | 5000 | 500 | 8000 | 0.7 | 1320 | 2078.393 | 0.188568 |
| 4000 | 3000 | 0 | 4000 | 1000 | 7000 | 0.7 | 1223 | 1939.289 | 0.169034 |
| 4000 | 2400 | 0 | 4000 | 400 | 6400 | 0.7 | 1056 | 1662.714 | 0.130194 |
| 3500 | 2400 | 0 | 3500 | 650 | 5900 | 0.7 | 1008 | 1593.657 | 0.120497 |
| 5000 | 3000 | 0 | 5000 | 500 | 8000 | 0.7 | 1320 | 2505.006 | 0.248477 |
| 4000 | 2400 | 0 | 4000 | 400 | 6400 | 0.7 | 1056 | 2004.005 | 0.178122 |
| 3500 | 2000 | 0 | 3500 | 250 | 5500 | 0.7 | 896 | 1696.562 | 0.134948 |
| 3000 | 1800 | 0 | 3000 | 300 | 4800 | 0.7 | 792 | 1503.004 | 0.107766 |

Figure 3:
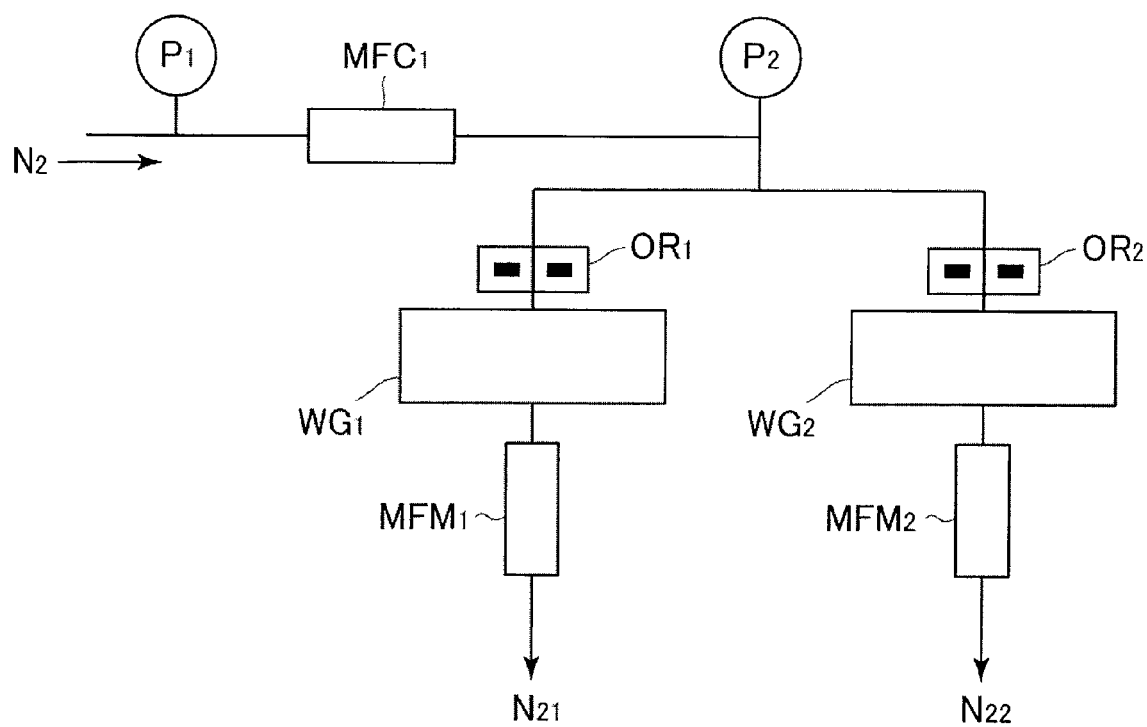
FIG. 3 is a system diagram in which $N_2$ gas is supplied instead of mixed gas G, and wherein the state of each divided flow toward each moisture-generating reactor is measured.

FIG. 3 shows a flow circuit in which the state of divided flows of $N_2$ gas has been examined when $N_2$ gas is supplied, instead of a mixed gas G, in the parallel operation of the moisture generating reactors in the first non-limiting, illustrative embodiment shown in FIG. 1. In FIG. 3, $MFC_1$, $MFM_1$, and $MFM_2$ designate mass flowmeters, respectively. In the flow circuit shown in FIG. 3, the measured value of $MFM_1$ and the measured value of $MFM_2$ are proportionate directly to the inflow of mixed gas G into the moisture generating reactors $WG_1$ and $WG_2$, respectively; hence, the amounts of moisture generated in the moisture generating reactors $WG_1$ and $WG_2$ can be determined from the measured values of the mass flowmeters $MFM_1$ and $MFM_2$.

Table 4, below, shows arithmetic values of a divided-flow error and a pressure error obtained from each measured value when the opening diameter of each of the orifices $OR_1$ and $OR_2$, of FIG. 3, is set at 0.7 mmφ, 0.6 mmφ, and 0.5 mmφ.

TABLE 4

| Orifice (mm) | Upstream pressure ① (MPa G) | $MFM_1$ ② (SLM) | $MFM_2$ ③ (SLM) | Divided-flow error ② and ③ % | Mean value ② and ③ (SLM) | Calculation value ④ | Pressure error ①-④ (MPa) |
|---|---|---|---|---|---|---|---|
| 0.8 | 0.011 | 1.15 | 1.13 | 1.74% | 1.14 | 0.0014 | 0.0096 |
| 0.8 | 0.020 | 2.69 | 2.67 | 0.74% | 2.68 | 0.0077 | 0.0123 |
| 0.8 | 0.046 | 5.19 | 5.17 | 0.39% | 5.18 | 0.0288 | 0.0172 |
| 0.8 | 0.088 | 7.63 | 7.68 | -0.66% | 7.655 | 0.0630 | 0.025 |
| 0.8 | 0.136 | 10.13 | 10.15 | -0.20% | 10.14 | 0.110 | 0.026 |
| 0.7 | 0.011 | 1.14 | 1.13 | 0.88% | 1.135 | 0.0024 | 0.0086 |
| 0.7 | 0.014 | 1.66 | 1.64 | 1.20% | 1.65 | 0.005 | 0.0090 |
| 0.7 | 0.017 | 2.16 | 2.17 | -0.46% | 2.165 | 0.0086 | 0.0084 |
| 0.7 | 0.023 | 2.69 | 2.65 | 1.49% | 2.67 | 0.0131 | 0.0099 |
| 0.7 | 0.027 | 3.17 | 3.18 | -0.32% | 3.175 | 0.0185 | 0.0085 |
| 0.7 | 0.034 | 3.69 | 3.67 | 0.54% | 3.68 | 0.0248 | 0.0092 |
| 0.7 | 0.04 | 4.2 | 4.18 | 0.48% | 4.19 | 0.0322 | 0.0078 |
| 0.7 | 0.048 | 4.69 | 4.68 | 0.21% | 4.685 | 0.0402 | 0.0078 |
| 0.7 | 0.057 | 5.17 | 5.18 | -0.19% | 5.175 | 0.0491 | 0.0079 |
| 0.6 | 0.036 | 2.74 | 2.61 | 4.74% | 2.675 | 0.0243 | 0.0117 |
| 0.6 | 0.045 | 3.24 | 3.11 | 4.01% | 3.175 | 0.0342 | 0.0108 |
| 0.6 | 0.061 | 3.75 | 3.61 | 3.73% | 3.68 | 0.046 | 0.0150 |
| 0.6 | 0.111 | 5.30 | 5.06 | 4.53% | 5.18 | 0.0911 | 0.0199 |
| 0.6 | 0.186 | 7.41 | 7.16 | 3.37% | 7.285 | 0.169 | 0.0170 |
| 0.6 | 0.193 | 7.52 | 7.27 | 3.32% | 7.395 | 0.173 | 0.020 |
| 0.6 | 0.201 | 7.79 | 7.52 | 3.47% | 7.655 | 0.183 | 0.018 |
| 0.6 | 0.210 | 7.99 | 7.72 | 3.38% | 7.855 | 0.19 | 0.020 |
| 0.6 | 0.224 | 8.33 | 8.03 | 3.60% | 8.18 | 0.202 | 0.022 |
| 0.6 | 0.238 | 8.74 | 8.43 | 3.55% | 8.585 | 0.217 | 0.021 |
| 0.6 | 0.258 | 9.28 | 8.95 | 3.56% | 9.115 | 0.237 | 0.021 |
| 0.6 | 0.304 | 10.44 | 10.06 | 3.64% | 10.25 | 0.279 | 0.025 |
| 0.5 | 0.011 | 0.61 | 0.63 | -3.28% | 0.62 | 0.0037 | 0.0073 |
| 0.5 | 0.017 | 1.12 | 1.15 | -2.68% | 1.135 | 0.0125 | 0.0045 |
| 0.5 | 0.028 | 1.64 | 1.66 | -1.22% | 1.65 | 0.0264 | 0.0016 |
| 0.5 | 0.043 | 2.16 | 2.17 | -0.46% | 2.165 | 0.0454 | -0.0024 |
| 0.5 | 0.062 | 2.67 | 2.68 | -0.37% | 2.675 | 0.0694 | -0.0074 |
| 0.5 | 0.088 | 3.18 | 3.17 | 0.31% | 3.175 | 0.0977 | -0.0097 |
| 0.5 | 0.111 | 3.71 | 3.66 | 1.35% | 3.685 | 0.130 | -0.019 |
| 0.5 | 0.134 | 4.20 | 4.18 | 0.48% | 4.19 | 0.161 | -0.027 |
| 0.5 | 0.162 | 4.70 | 4.67 | 0.64% | 4.685 | 0.192 | -0.03 |
| 0.5 | 0.189 | 5.19 | 5.16 | 0.58% | 5.175 | 0.215 | -0.026 |

Figure 4:
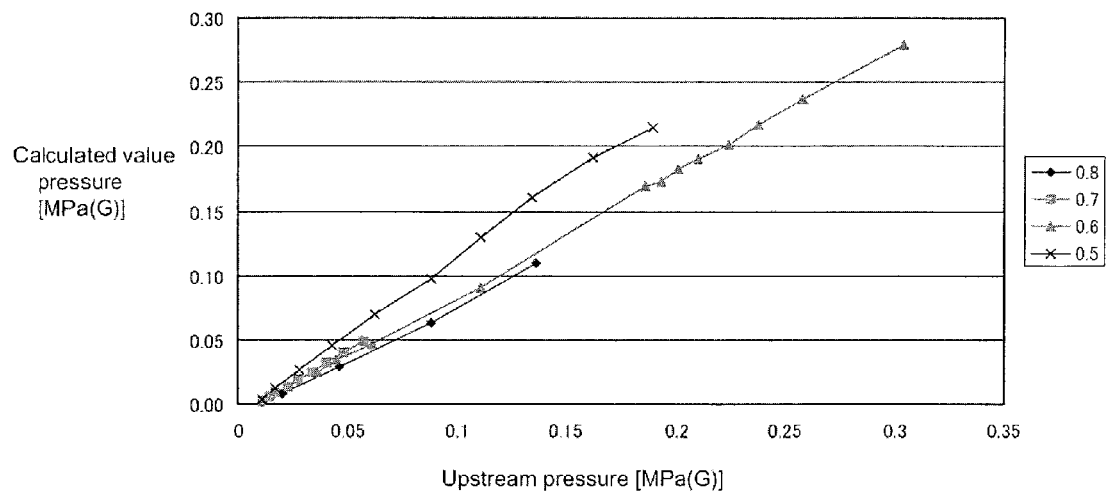
FIG. 4 shows graphs, each exhibiting arithmetic values of Table 3, in which (a) shows the relationship of the divided-flow error to the flow rate ($MFM_1$), (b) shows the relationship of the divided-flow error to the orifice upstream-side pressure $P_2$, (c) shows the relationship between the orifice upstream-side pressure $P_2$ and the calculated pressure, and (d) shows the relationship between the orifice upstream-side pressure $P_2$ and the relative divided-flow error (%) of the flow rate.
Figure 4:
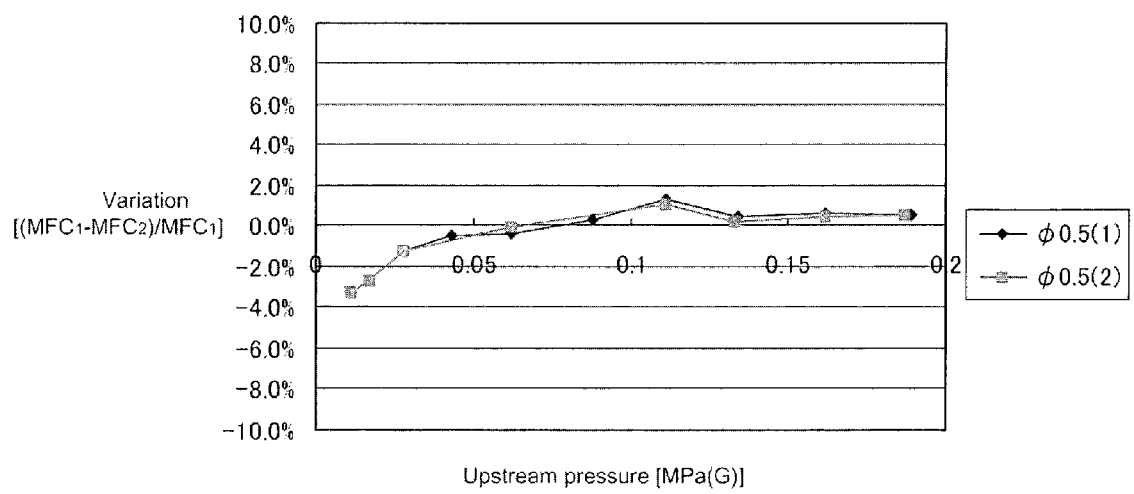

Figures (a), (b), (c), and (d) of FIG. 4 are graphs of the arithmetic values compiled in Table 3. FIG. 4(a) shows the relationship of the divided-flow error to the flow rate (MFM₁), FIG. 4(b) shows the relationship of the divided-flow error to the orifice upstream-side pressure P₂, FIG. 4(c) shows the relationship between the orifice upstream-side pressure P₂ and the calculated pressure, and FIG. 4(d) shows the relationship between the orifice upstream-side pressure P₂ and the relative divided-flow error % of the flow rate.

As is apparent from Table 4 and figures (a), (b), (c), and (d) of FIG. 4, the divided-flow error (FIG. 4(a)) stays below about 5%, and the variation (MFM₁−MFM₂/MFC₁) also stays below 3%. Therefore, the divided flows created by the orifices $OR_1$ and $OR_2$ can be used without, from a practical standpoint, causing any problems, and it is understood that mixed gas G can be allowed to branch off and be supplied to the moisture generating reactors $GW_1$ and $GW_2$ by using an extremely simple flow-dividing device.

Exemplary Embodiment 1

Figure 5:
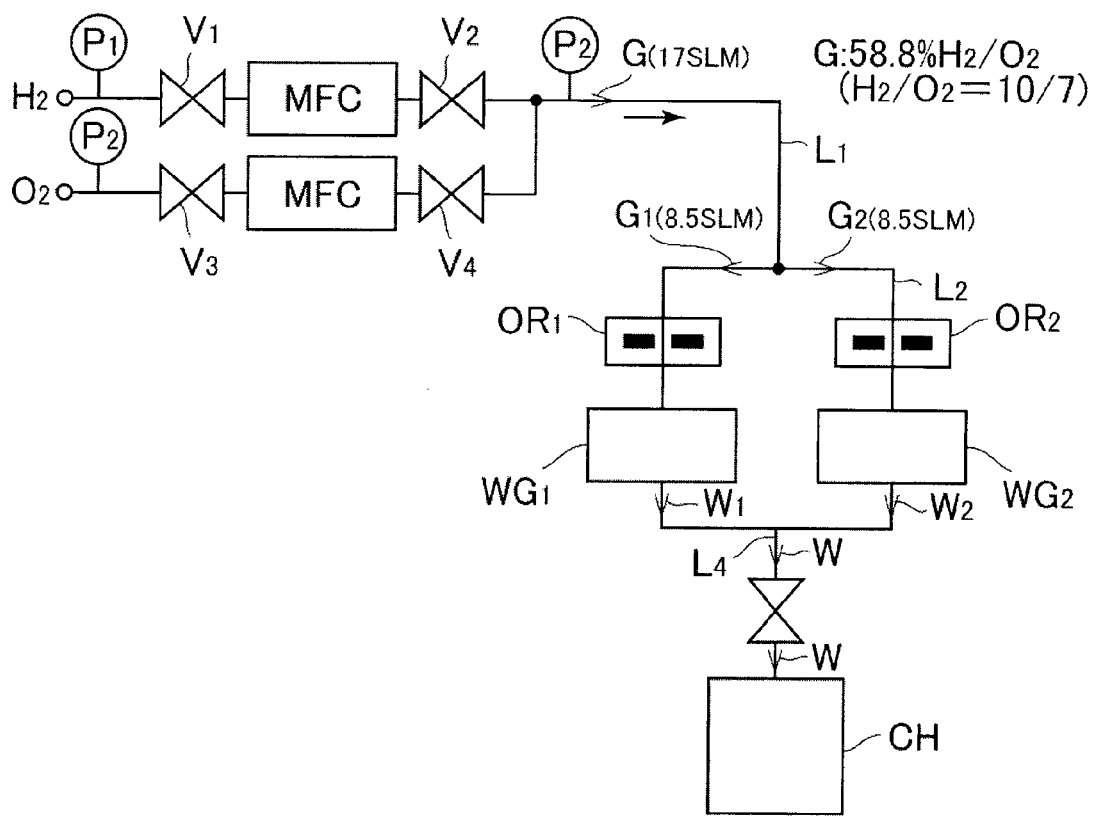
FIG. 5 is a system diagram wherein 17 Standard Liters per Minute (SLM) moisture gas is supplied from two moisture generating reactors to a chamber CH under normal pressure.

FIG. 5 is a system diagram wherein 17 SLM moisture gas W is supplied to the chamber CH, which operates under normal pressure (760 Torr), using the two moisture generating reactors $WG_1$ and $WG_2$. Table 5, below, shows orifice upstream-side pressures calculated from the flow rate Q and from the sectional area S on the assumption that a critical condition is established between the upper and lower streams of the orifices $OR_1$ and $OR_2$, shown in the system diagram of FIG. 5.

Formula (1) is the operational expression of the flow rate Q.

[Formula 1]

$$Q = \frac{SP_H}{\sqrt{T_H}} \cdot C' \cdot (F.F.) \quad (1)$$

In this equation, Formula I, Q is a flow rate of gas, S is an orifice sectional area, $T_H$ is a temperature of gas, $P_H$ is upstream pressure, C is the constant 187021, and C' is a correction (C×0.82) calculated from an actual flow rate.

TABLE 5

| Orifice | Sectional area S | Stream above orifice | | Stream below orifice |
|---|---|---|---|---|
| mm | mm² | kPa abs | Torr | Torr |
| 0.65 | 0.332 | 202.6 | 1519.5 | 759.8 |
| 0.6 | 0.283 | 237.7 | 1783.4 | 891.7 |
| 0.55 | 0.238 | 282.9 | 2122.3 | 1061.2 |

TABLE 5-continued

| Orifice | Sectional area S | Stream above orifice | | Stream below orifice |
|---|---|---|---|---|
| mm | mm² | kPa abs | Torr | Torr |
| 0.5 | 0.196 | 342.4 | 2568.0 | 1284.0 |
| 0.45 | 0.159 | 422.7 | 3170.4 | 1585.2 |
| 0.4 | 0.126 | 534.9 | 4012.6 | 2006.3 |

Exemplary Embodiment 2

In the same system diagrammed as that of FIG. 5, pressure $P_1$ and pressure $P_2$ on the upstream side (i.e., tube upstream side) and on the downstream side (i.e., above the orifices $OR_1$ and $OR_2$) of the mass flowmeter MFC have been respectively calculated when mixed gas G consisting of $H_2$ and $O_2$, corresponding to moisture generation of 17 SLM, is allowed to flow. Formulas (2) and (3) are operational expressions therefor.

[Formula 2]

$$Q = C(P_1 - P_2) \quad (2)$$

[Formula 3]

$$C = \frac{\pi}{8\eta} \frac{a4}{l} \left( \frac{p_1 + p_2}{2} \right) \quad (3)$$

In the equations of Formulas (2) and (3), Q is a flow rate of gas, $P_1$ is upstream pressure, $P_2$ is downstream pressure, a is an orifice radius, and η is a viscosity coefficient of the gas. When a tube pressure loss ($H_2/O_2$) is calculated, the viscosity coefficient of mixed gas G cannot be calculated and, hence, a calculation is performed both for $H_2$ and for $O_2$ as shown in Table 6 (the viscosity coefficient η of $H_2$ is $0.88 \times 10^{-5}$ Pa·sec, and the viscosity coefficient ζ of $O_2$ is $1.75 \times 10^{-5}$ Pa·sec).

TABLE 6

| Orifice | Sectional area S | Stream above orifice | | Stream below orifice | Upper stream ($H_2$) through tube | | Upper stream ($O_2$) through tube | |
|---|---|---|---|---|---|---|---|---|
| mm | mm² | kPa abs | Torr | Torr | kPa abs | Torr | kPa abs | Torr |
| 0.8 | 0.503 | 133.7 | 1003.3 | 501.6 | 187.4 | 1406 | 240.2 | 1801 |
| 0.75 | 0.442 | 152.2 | 1141.3 | 570.7 | 201.0 | 1508 | 250.9 | 1882 |
| 0.7 | 0.385 | 174.7 | 1310.2 | 655.1 | 218.5 | 1639 | 265.1 | 1989 |
| 0.65 | 0.353 | 190.7 | 1430.2 | 715.1 | 231.5 | 1737 | 275.9 | 2070 |
| 0.66 | 0.342 | 196.5 | 1473.8 | 736.9 | 236.3 | 1773 | 280.0 | 2100 |

Exemplary Embodiment 3

Figure 6:
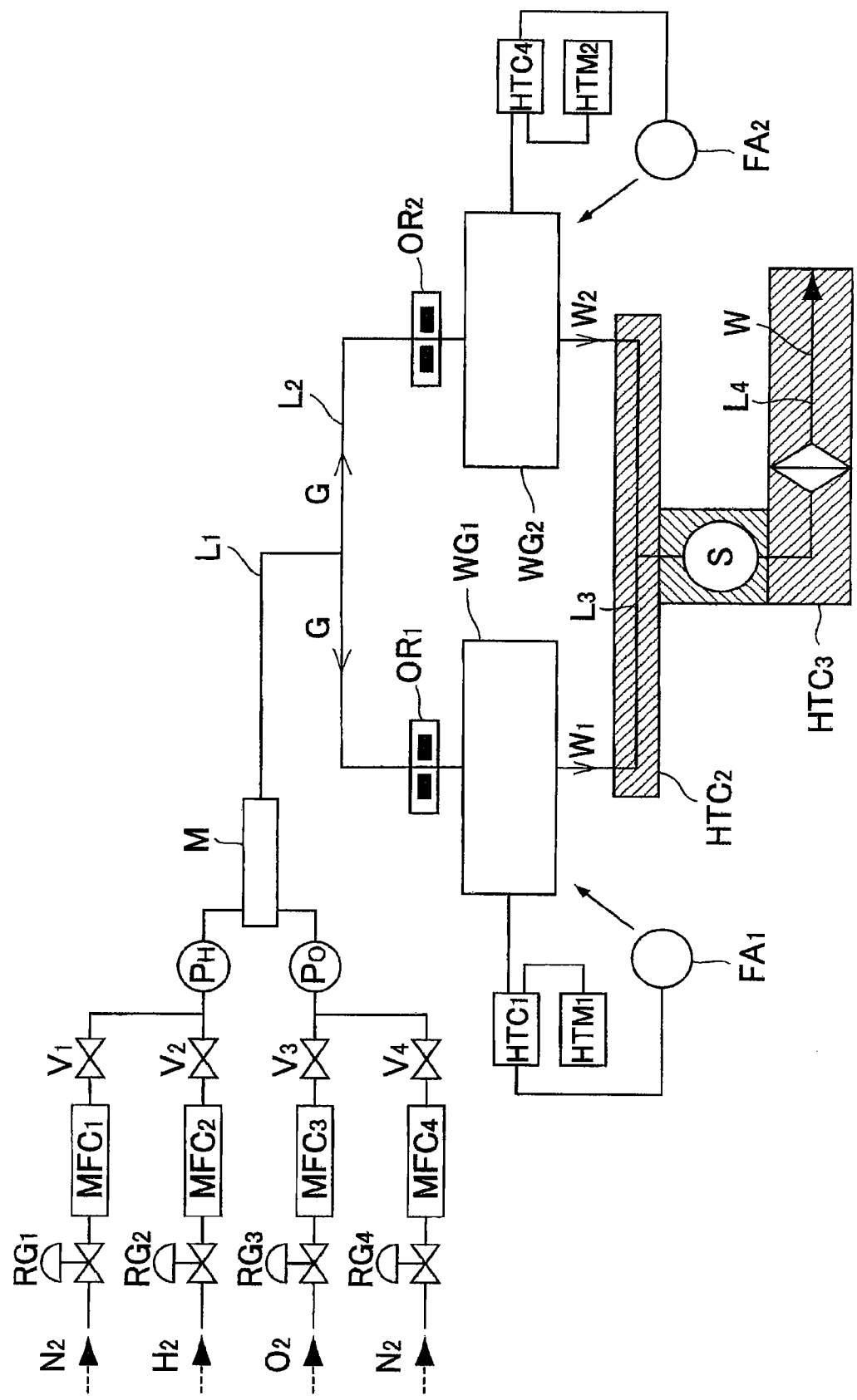
FIG. 6 is a system diagram showing a moisture supply state created by actual parallel operation using two moisture generating reactors (whose rating is 5 SLM).

FIG. 6 is a system diagram showing parallel operation of two moisture generating reactors $WG_1$ and $WG_2$ performed according to the present invention. In FIG. 6, $RG_1$ to $RG_4$ designate pressure regulators, $V_1$ to $V_4$ designate valves, $FA_1$ and $FA_2$ designate cooling fans, $HTC_1$, $HTC_2$, $HTC_3$, and $HTC_4$ designate temperature controllers, and $HTM1_1$ and $HTM_2$ designate temperature monitors. The outlet side of each of the moisture generating reactors $WG_1$ and $WG_2$ opens toward the atmosphere.

The temperature controllers $HTC_1$ and $HTC_4$ are used to keep the temperature of the moisture generating reactors $WG_1$ and $WG_2$ at 350° C., and the cooling fans $FA_1$ and $FA_2$ are controllably operated, if necessary. The temperature controllers $HTC_2$ and $HTC_3$ are used to keep the temperature of the tube lines at 140° C. Each of the orifices $OR_1$ and $OR_2$ is an orifice whose opening diameter is 0.7 mm$\phi$, and each of the moisture generating reactors $WG_1$ and $WG_2$ is a 5 SLM type reactor having an outer diameter of 180 mm$\phi$.

According to the system diagram of FIG. 6, mixed gas G ($H_2$=6 SLM to 10 SLM, $O_2$=7 SLM) flows from the gas mixer M to each of the moisture generating reactors $WG_1$ and $WG_2$ through the orifices $OR_1$ and $OR_2$, and supply pressures $P_O$ and $P_H$ of $O_2$ gas and $H_2$ gas, respectively, and the concentration of unreacted $H_2$, and a change in temperature caused when moisture was generated, were measured. The amount of moisture to be generated was set between 6 SLM and 10 SLM in the single moisture generating reactor.

Figure 7:
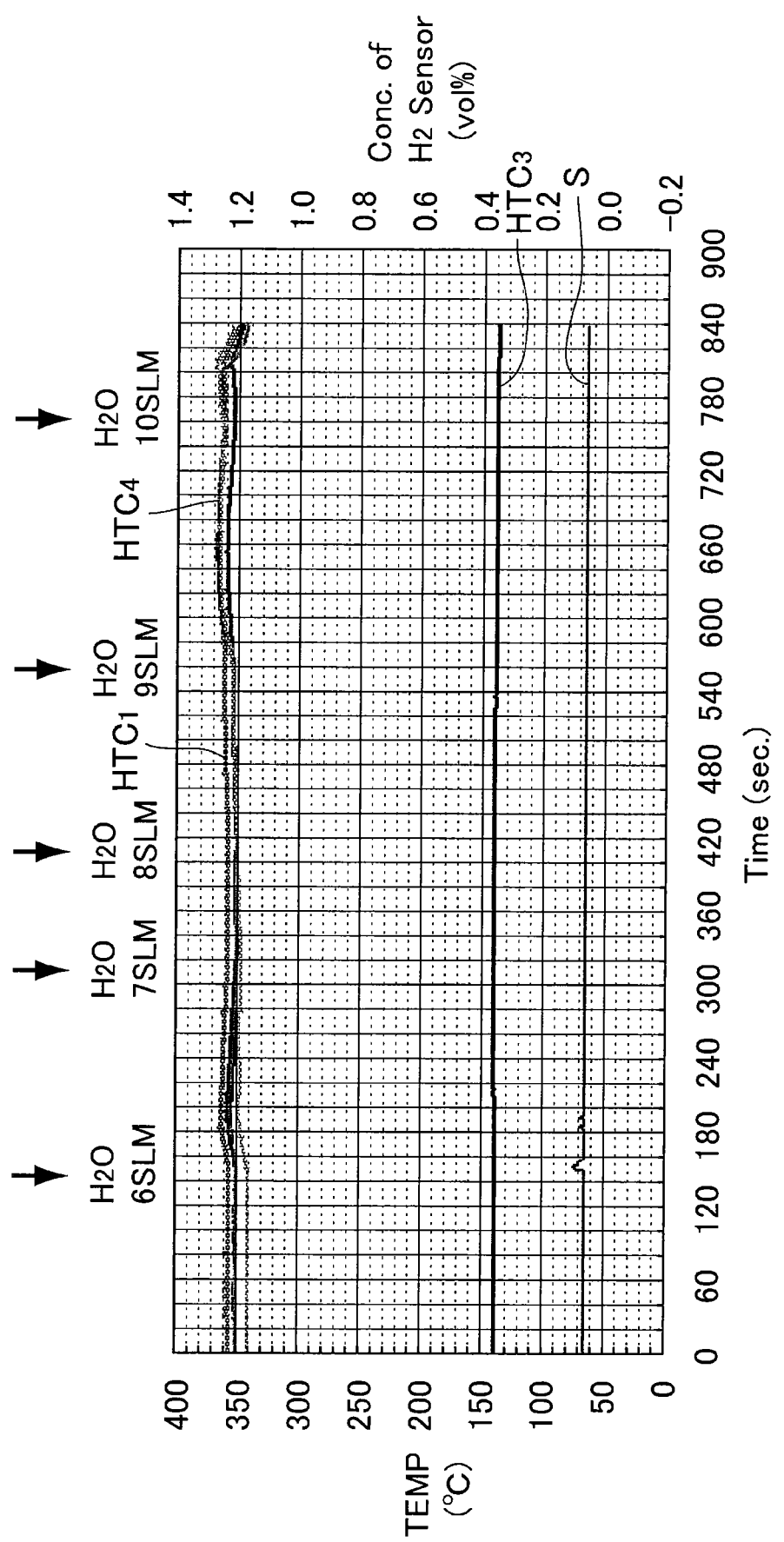
FIG. 7 is a graph showing one example of test results obtained with respect to the system diagram according to FIG. 6.
Figure 8:
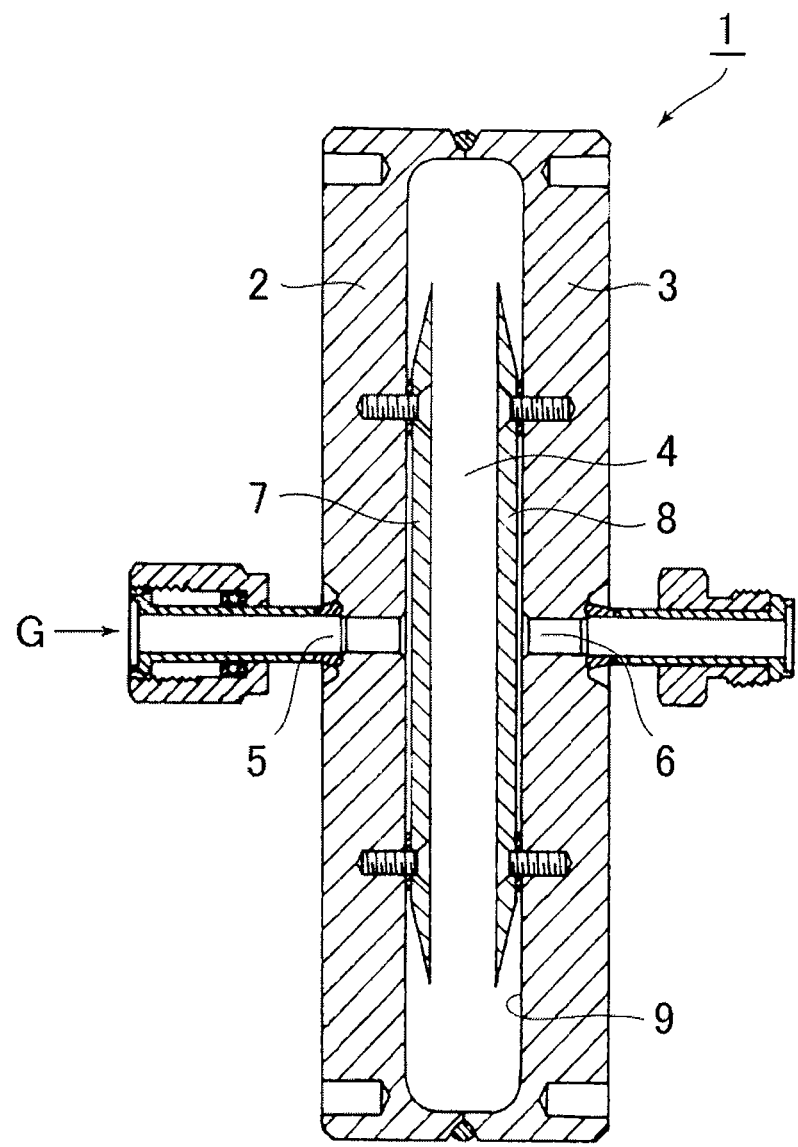
FIG. 8 is a sectional view showing an example of a conventional moisture generating reactor.
Figure 9:
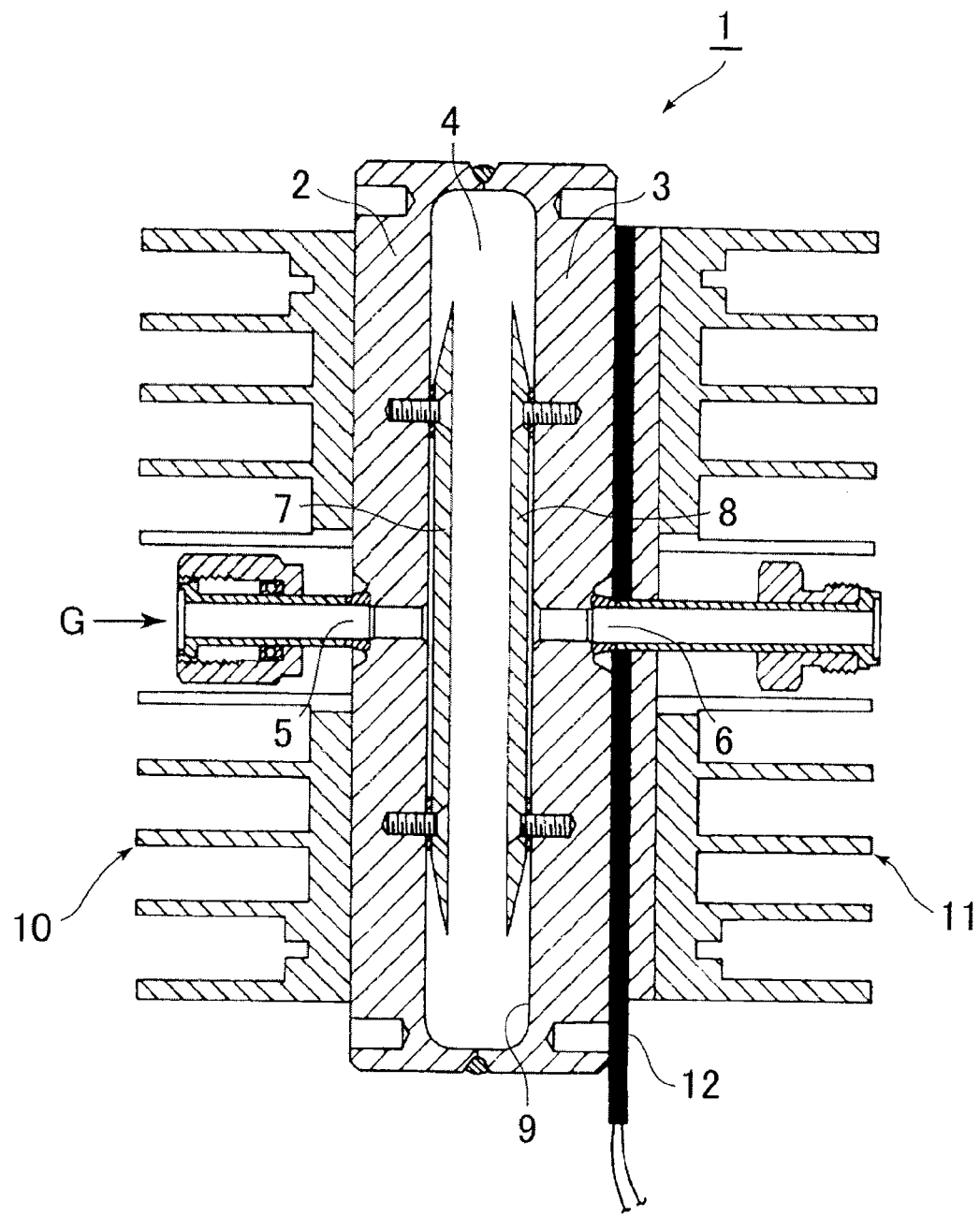
FIG. 9 is a sectional view showing an example of a conventional moisture generating reactor provided with cooling fins.

Table 7 shows moisture generation test results corresponding to operation of the system shown in FIG. 6. FIG. 7 is a graph outlining the test results.

TABLE 7

| $H_2$ (SLM) | $O_2$ (SLM) | $H_2O$ (SLM) | $HTC_1$-$R_1$ Temperature Max. (° C.) | $HTM_1$-$R_1$ Temperature Max. (° C.) | $HTC_4$-$R_2$ Temperature Max. (° C.) | $HTM_2$-$R_2$ Temperature Max. (° C.) | Unreacted $H_2$ Concentration Max. (Vol %) | $P_H$ (MPaG) | $P_O$ (MPaG) |
|---|---|---|---|---|---|---|---|---|---|
| 6 | 7 | 6 | 357 | 362 | 358 | 347 | 0.08 | 0.091 | 0.089 |
| 7 | 7 | 6 | 350 | 350 | 351 | 357 | 0.08 | 0.094 | 0.093 |
| 8 | 7 | 6 | 353 | 353 | 353 | 360 | 0.08 | 0.099 | 0.097 |
| 9 | 7 | 6 | 366 | 364 | 360 | 364 | 0.08 | 0.102 | 0.100 |
| 10 | 7 | 6 | 359 | 366 | 366 | 367 | 0.08 | 0.105 | 0.103 |

As is apparent from FIG. 7 and Table 7, it is understood that mixed gases G, each of which is equal in amount, flow into the moisture reactors $WG_1$ and $WG_2$, respectively, by flow division, and the two moisture reactors cause an equal rise in temperature by substantially the same moisture generation reaction. Additionally, it is understood from FIG. 7 and Table 7 that the concentration of unreacted $H_2$ is also kept stably at a low value by operation of the two moisture generation reactors in parallel.

INDUSTRIAL APPLICABILITY

The present invention can be applied not only to semiconductor manufacturing facilities, and to chemical manufacturing facilities, but also to high-purity water supply facilities, or the like, in the food processing industry or the pharmaceutical industry.

The invention claimed is:

1. A method for parallel operation of moisture generating reactors, comprising the steps of:
   (a) providing a two moisture generating reactors, wherein an orifice is disposed on a mixed-gas inlet side of each moisture generating reactor, and an inlet side of each orifice is connected to a mixed-gas supply line in parallel so that the two moisture generating reactors are connected in parallel, and each orifice of the orifices disposed on the mixed-gas inlet side of the two moisture generating reactors is equal in opening diameter to each other orifice disposed on the mixed-gas inlet side;
   (b) providing a mixed gas consisting of hydrogen and oxygen, and allowing the mixed gas to branch off through each of the orifices so that the mixed gas is supplied to each moisture generating reactor, wherein the mixed gas is supplied so that mixed gas substantially equal in amount to each other is supplied from the mixed-gas supply line to each of the two moisture generating reactors;
   (c) supplying moisture generated by each of the two moisture generating reactors along a moisture supply line to a process chamber that uses the moisture, wherein each moisture generating reactor has an end on a moisture gas outlet side, and the ends of the reactors are connected in parallel to each other, and wherein an internal pressure of each moisture generating reactor has a pressure value of 200 Torr or more;
   (d) operating the process chamber under a pressure of 1 to 760 Torr, wherein the moisture supply line that supplies moisture generated from the moisture generating reactors is provided with a depressurizing orifice; and
   (e) using the depressurizing orifice to depressurize the moisture supplied to the chamber by the moisture supply line.

2. The method for parallel operation of moisture generating reactors according to claim 1, wherein a rated amount of moisture generation of each reactor of the plurality of moisture generating reactors is 5 SLM to 10 SLM, and an opening diameter of each orifice disposed on the mixed-gas inlet side is 0.8 to 0.6 mm$\phi$.

3. The method for parallel operation of moisture generating reactors according to claim 1, wherein each moisture generating reactor has an internal space formed by combining an inlet-side reactor body member and an outlet-side reactor body member together so as to face each other, wherein the inlet-side reactor body member is provided with a mixed-gas inlet and the outlet-side reactor body member is provided with a moisture-gas outlet, and a platinum coating film is disposed on an inner wall surface of the outlet-side reactor body member, and a reflector is disposed in the internal space, and the method further comprises the step of:
   (f) generating moisture by allowing the hydrogen gas and the oxygen gas of the mixed gas to react with each other by catalytic action of the platinum coating films of the moisture generating reactors under a non-combustion state inside the internal spaces of the moisture generating reactors.

4. The method for parallel operation of moisture generating reactors according to claim 1, wherein an inner diameter of the orifice disposed on the mixed-gas inlet side of each moisture generating reactor is the same for each orifice.

5. The method for parallel operation of moisture generating reactors according to claim 1, wherein each orifice comprises a stainless steel plate in which a circular orifice hole having the inner diameter has been bored.

6. The method for parallel operation of moisture generating reactors according to claim 1, wherein the mixed gas branches off through each of the orifices with a divided-flow error of below about 5%.

7. A method for parallel operation of moisture generating reactors, comprising the steps of:
(a) providing a plurality of moisture generating reactors, wherein each moisture generating reactor has an internal space formed by combining an inlet-side reactor body member and an outlet-side reactor body member together so as to face each other, wherein the inlet-side reactor body member is provided with a mixed-gas inlet and the outlet-side reactor body member is provided with a moisture-gas outlet, and a platinum coating film is disposed on an inner wall surface of the outlet-side reactor body member, and a reflector is disposed in the internal space, wherein an orifice is disposed on the mixed-gas inlet side of each moisture generating reactor of the plurality of moisture generating reactors, and an inlet side of each orifice is connected to a mixed-gas supply line in parallel so that the plurality of moisture generating reactors are connected in parallel, wherein each orifice comprises a stainless steel plate in which a circular orifice hole having an inner diameter has been bored, and the inner diameter of the orifice disposed on the mixed-gas inlet side of each moisture generating reactor of the plurality of moisture generating reactors is the same for each orifice;
(b) providing a mixed gas consisting of hydrogen and oxygen, and allowing the mixed gas to branch off through each of the orifices so that the mixed gas is supplied to each reactor of the plurality of moisture generating reactors;
(c) supplying moisture generated by each reactor of the plurality of moisture generating reactors along a moisture supply line to an apparatus that uses the moisture, wherein each reactor has an end on a moisture gas outlet side, and the ends of the reactors are connected in parallel to each other; and
(d) generating moisture by allowing the hydrogen gas and the oxygen gas of the mixed gas to react with each other by catalytic action of the platinum coating films of the plurality of moisture generating reactors under a non-combustion state inside the internal spaces of the plurality of moisture generating reactors.

8. The method for parallel operation of moisture generating reactors according to claim 7, wherein the mixed gas branches off through each of the orifices with a divided-flow error of below about 5%.

9. A method for parallel operation of moisture generating reactors, comprising the steps of:
(a) providing two moisture generating reactors, wherein each moisture generating reactor has an internal space formed by combining an inlet-side reactor body member and an outlet-side reactor body member together so as to face each other, wherein the inlet-side reactor body member is provided with a mixed-gas inlet and the outlet-side reactor body member is provided with a moisture-gas outlet, and a platinum coating film is disposed on an inner wall surface of the outlet-side reactor body member, and a reflector is disposed in the internal space, wherein an orifice is disposed on the mixed-gas inlet side of each moisture generating reactor, and an inlet side of each orifice is connected to a mixed-gas supply line in parallel so that the moisture generating reactors are connected in parallel, wherein each orifice comprises a stainless steel plate in which a circular orifice hole having an inner diameter has been bored, and the inner diameter of the orifice disposed on the mixed-gas inlet side of each moisture generating reactor is the same for each orifice;
(b) providing a mixed gas consisting of hydrogen and oxygen, and allowing the mixed gas to branch off through each of the orifices so that the mixed gas is supplied to each moisture generating reactor moisture generating reactors;
(c) supplying moisture generated by each moisture generating reactor along a moisture supply line to an apparatus that uses the moisture, wherein each reactor has an end on a moisture gas outlet side, and the ends of the moisture generating reactors are connected in parallel to each other; and
(d) generating moisture by allowing the hydrogen gas and the oxygen gas of the mixed gas to react with each other by catalytic action of the platinum coating films of the moisture generating reactors under a non-combustion state inside the internal spaces of the moisture generating reactors,
wherein a rated amount of moisture generation for each one of the moisture generating reactors is 5 SLM to 10 SLM, and an opening diameter of each orifice disposed on an inlet side is 0.8 to 0.6 mm $\phi$.

10. The method for parallel operation of moisture generating reactors according to claim 9, wherein the mixed gas branches off through each of the orifices with a divided-flow error of below about 5%.

* * * * *